Figure 1:
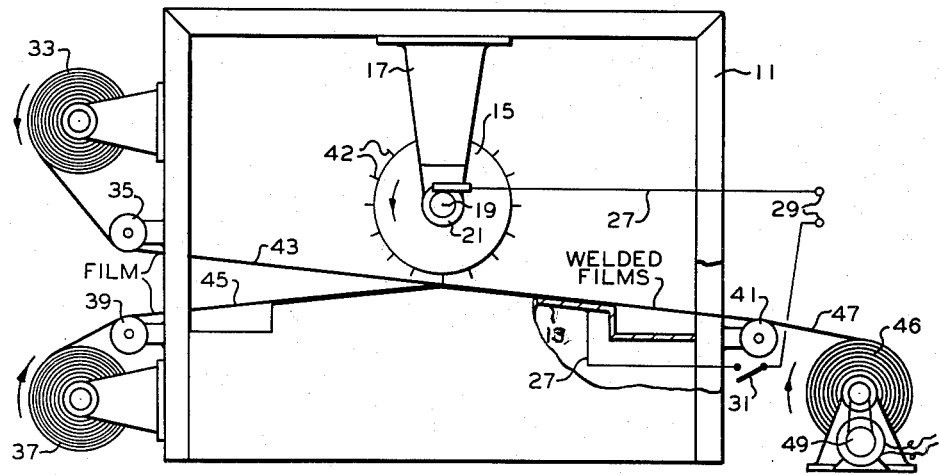

Dec. 24, 1963     C. J. STACY     3,115,564
APPARATUS FOR CUTTING AND HEAT-SEALING THERMOPLASTIC FILMS
Filed June 30, 1961

INVENTOR.
C.J. STACY
BY *Hudson & Young*
ATTORNEYS

United States Patent Office 3,115,564
Patented Dec. 24, 1963

3,115,564
APPARATUS FOR CUTTING AND HEAT-SEALING THERMOPLASTIC FILMS
Carl J. Stacy, Bartlesville, Okla., assignor to Phillips Petroleum Company, a corporation of Delaware
Filed June 30, 1961, Ser. No. 121,234
6 Claims. (Cl. 219—19)

This invention relates to sealing one thermoplastic material to another thermoplastic material. In one aspect, it relates to sealing one layer of a thermoplastic material to another layer of a thermoplastic material. In another aspect, it relates to a method and apparatus for simultaneously cutting and sealing one layer of a thermoplastic material to another layer of a thermoplastic material.

With the present wide usage and the future anticipated still wider usage of thermoplastic materials in packaging and for other uses, the development of methods and apparatus for fabricating, handling, cutting and joining thermoplastic materials is very important. Many machines for carrying out the above-mentioned operations have been devised. However, improvements in known devices and methods in many instances are very advantageous.

It is an object of this invention to provide an improved method and means for sealing one thermoplastic material to another thermoplastic material. Another object of this invention is to provide a method and apparatus for sealing one layer of a thermoplastic material to another layer of a thermoplastic material. Still another object of this invention is to provide an improved method and apparatus for simultaneously cutting and sealing one layer of a thermoplastic material to another layer of a thermoplastic material. Still other objects and advantages of this invention will be realized upon reading the following description which, taken with the attached drawing, forms a part of this specification.

According to this invention, there is provided an improved method and apparatus for sealing a layer of thermoplastic material to another layer of thermoplastic material and, in one embodiment, simultaneously cutting or trimming the layers of materials. In one instance, the cutting means or cutter comprises a peripheral edge on the rim of a wheel, which edge upon cutting a thermoplastic film contacts a metal plate thereby completing an electrical circuit. This completed electrical circuit heats the relatively high resistance cutting edge of the wheel to a thermoplastic material sealing temperature, thereby simultaneously cutting the films to be sealed and sealing same in one unitary operation. In another aspect, the sealing means comprises a wheel provided with high resistance needles or spikes extending radially from its periphery. These spikes upon piercing the thermoplastic material to be sealed complete a circuit thereby heating the penetrating spikes to a thermoplastic sealing temperature with the result that the thermoplastic is sealed at the edges of the opening produced by the spike.

Figure 4:
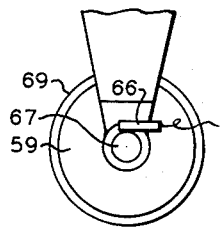
Figure 5:
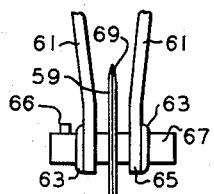
Figure 2:
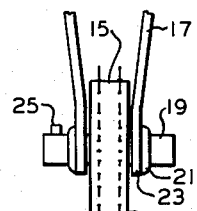
Figure 3:
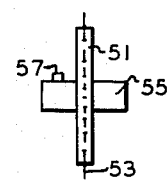
Figures 6, 7:
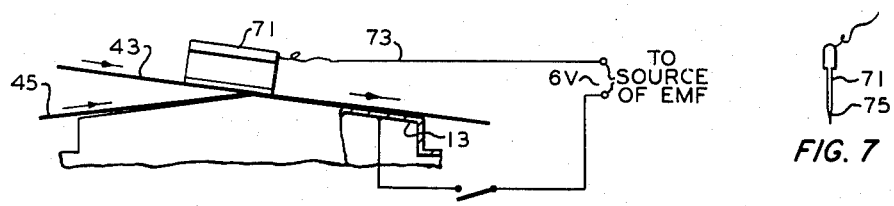

In the drawing, FIGURE 1 illustrates, in diagrammatic form, one assembly of apparatus parts for heat sealing layers of thermoplastic material to one another. FIGURE 2 is an elevational view of a portion of the apparatus of FIGURE 1. FIGURE 3 is an elevational view of an alternate embodiment of the apparatus of FIGURE 2. FIGURE 4 is a side elevational view of an alternate embodiment of a portion of the apparatus of FIGURE 1. FIGURE 5 is an end view of the apparatus of FIGURE 4. FIGURE 6 is a side elevational view of still another embodiment of apparatus useful alternatively with a portion of the apparatus of FIGURE 1. FIGURE 7 is an end view of a portion of the apparatus of FIGURE 6.

In the drawing, specifically in FIGURE 1, reference numeral 11 identifies the structural framework for supporting the apparatus of this invention. A metal plate 13 is rigidly supported by said framework while a spiked wheel 15 is rotatably supported by the upper portion of said framework. Reference numeral 17 identifies the support attached to the upper portion of framework 11 for supporting wheel 15. Wheel 15 is mounted on shaft 19 around which are bearings 23, illustrated in FIGURE 2. Collars 21 are positioned on the sides of bearings 23 opposite wheel 15 for maintaining the shaft and wheel in their operative position.

The shaft 19, (wheel 15 and protruding spikes 42 are electrical conductors insulated from support 17 by means not shown. Alternately, support 17 may be insulated from frame 11 without necessity of insulating the bearing 23 from support 17. In general, it will be preferable to confine the circuit to a minimum of area. A brush 25 is provided in operable contact with shaft 19 for conducting current to or from the shaft. Electrical leads 27 connect brush 25 and plate 13 by way of a switch 31 to a source of electrical current 29. Rolls of plastic 33 and 37 provide the sheet plastic materials to be heat sealed. Idler rollers 35 and 39 guide the plastic into the sealing or cutting and sealing mechanism. A guide roller or idler 41 guides the cut and heat-sealed or the heat-sealed material from the cutting and heat-sealing apparatus or from the heat-sealing apparatus, respectively, to a film-receiving roller 46. A motor 49 rotates the film-receiving roller, the operation of which draws or pulls the films to be sealed or cut and sealed through the apparatus. Reference numeral 47 identifies the cut and sealed or sealed films moving from the apparatus. Reference numerals 43 and 45 identify the separate original films to be sealed and/or sealed and cut in the apparatus, as illustrated in FIGURE 1. The sealing roller 15, FIGURE 2, is provided with two rows of spikes 42 while the wheel 51 illustrated in FIGURE 3 is provided with only a single row of spikes 53. When the roller of wheel 51 of FIGURE 3 is used, a single row of sealing punch openings is made in the materials to be heat sealed, while if the wheel 15 illustrated in FIGURE 2 is used there are two rows of these sealing punch openings. Wheel 51 is mounted on shaft 55 having a brush 57 operatively mounted thereon for electrical connection.

This portion of the apparatus for this embodiment operates as follows. While plate 13 is a conductor of electrical current, it is a better conductor or, in other words, it has a lower resistance than the resistance of the spike wheels. In other words, the wheel spikes have a greater electrical resistance than the plate. In this manner, when the spikes puncture or perforate the films to be sealed on passage of the film between the spike wheels and plate 13 upon contact of the ends of the spikes with plate 13, an electrical circuit is completed. The completion of this circuit heats the points of the spikes because of their relatively high electrical resistance and the heating is to such an extent that the periphery of the punched openings are fused together and held in much the same manner as a grommet eyelet holds together several layers of cloth. The spikes 53 or 42 can be placed as close together as desired for increasing the number of punch or seal points per inch or they can be spaced as widely separated as desired. While FIGURE 3 illustrates a single row of spikes and FIGURE 2 illustrates two rows of spikes, it will realized that wheels similar to wheels 51 and 15 can be provided with as many rows of spikes as desired.

FIGURES 4 and 5 illustrate a cutter wheel provided with a cutting edge 69 positioned on the periphery of the wheel 59. The wheel can be of metal, carbon, etc. as long as suitable strength and electrical conductance or resistance are provided. This wheel is mounted on a shaft 67 supported by bearings 65 with the shaft being retained in its proper position by collars 63. A brush 66 is provided for completing the circuit between the shaft and wheel with the source of current. Bearings 65 are attached to supports 61 which in turn are mounted on a structural framework similar to framework 11 of FIGURE 1. This wheel 59 replaces the spike wheels 15 or 51 and operates in general in the same manner. When the several films are fed between the cutting wheel 59 and plate 13, the cutting edge 69 cuts the several films and while cutting the films, because of the relatively high electrical resistance, preferably of only cutting edge 69, the cut edges of the film are fused together. In this manner, the sheets of film are cut into two portions and the mutually adjacent cut edges of the films are welded together.

The embodiment illustrated in FIGURES 6 and 7 operates, in general, in the same manner as those hereinbefore described. The cutter 71, however, is a stationary cutter and can be, if desired, a cutter more or less similar to a safety razor blade. The end of the cutter blade 71, as regards the direction of movement of films 43 and 45, is spaced from the adjacent section of plate 13 in such a manner that the films can be fed between the cutter 71 and plate 13. The opposite end of the cutter knife 71 is in contact with the adjacent portion of plate 13 in such a manner that as the films 43 and 45 are moved from left to right, as illustrated in FIGURE 6, the films come in contact with the sharp cutting edge 75 of knife 71. This sharp edge cuts the film and as the cut surfaces come in contact with the portion of the cutting edge 75 which is in contact with plate 13 the mutually adjacent cut edges of films are heat sealed. This cutting knife is made with an electrical resistance higher than that of plate 13 so that the knife edge or cutting tip (cutlery steels, razor blade steels, tungsten steels, and the like) will be maintained at a temperature sufficient to seal the thermoplastic material being processed. Plate 13 in the several embodiments is made of sufficient bulk to provide a lower electrical resistance so that it will be fairly cool, at least at a temperature below the heat-sealing temperature of the film being processed. The low temperature of plate 13 is provided so that immediately after sealing of the films the sealed films will be cooled prior to their rolling on the receiving roll. Electrical circuit 73 is provided with the apparatus of FIGURE 6 similar to circuit or leads 27 of FIGURE 1.

In one instance, a sharp-pointed steel needle was connected to the lead from one terminal of a six-volt alternating current power source. The lead from the other terminal was connected to a steel rule which served as plate 13. Two sheets of a polyethylene film were laid across the rule and the needle was forced through the layers of plastic until the needle was contacted with the metal rule. The needle heated, melting the plastic in contact with the hot surface of the needle. An ammeter positioned in the circuit indicated a flow of four amperes of current.

This method of joining layers of thermoplastic material is applicable for closing bags or packages with a breathing closure and for tacking together two or more sheets of such a thermoplastic material as a polyethylene, providing for the production of tufted pads and the like.

As an example of the use of the cutter wheel illustrated in FIGURES 4 and 5, a glass cutter was connected to a lead from a six-volt source of alternating current. The other lead was connected to a steel rule. Two sheets of a thermoplastic material, such as a polyethylene, were positioned in contact with each other on a metal rule. The glass cutter was slowly drawn across the layers of plastic immediately above the rule. The plastic was cut into two pieces of double thickness. When the cut edges were contacted with the wheel of the cutter, these adjacent cut edges were fused to each other in such a manner that each pair of thermoplastic sheets was fused together. When each pair of cut sheets was unfolded the sheets were joined together by a joint quite similar in appearance to that of a butt weld.

As an example of the use of a cutting apparatus illustrated in FIGURES 6 and 7, a razor blade was clamped into a supporting apparatus similar to that used for support of the above-mentioned glass cutter. The leading edge of the razor blade was raised a short distance from the rule while the following edge was retained in contact with the rule for completion of electrical circuit and heating of the cutting edge in that vicinity. Upon slowly drawing a pair of sheets of polyethylene in cutting relation through this latter described apparatus, the sheets were cut by the razor blade at a point near the point of contact of the razor blade with the rule and at this point, the razor blade having a greater electrical resistance than the resistance of the rule, heat sealed the thermoplastic sheets together. In still another example of the use of the razor blade, the blade was positioned with its cutting edge parallel to the adjacent surface of the rule in such a manner that when the razor blade was lowered and its cutting edge forced through the layers of thermoplastic material, the cut thermoplastic materials were sealed along each side of the razor blade. In this manner, relatively short slits were cut at desired spaced intervals.

These methods of attaching a layer of thermoplastic material to another provided relatively strong seals.

While many steels are suitable for use in the cutters, needles, spikes, wheels, etc., where heavy duty operations are anticipated it may be desirable to employ special hot-work die steels of the chromium type-10 tool steel or type-11 tool steels of the tungsten-chromium type or type-13 high-speed tool steels. Because some of these materials are hard to work and expensive, it may be preferable to make only the actual contact edge or tip of the cutter or spike of the alloys.

The following are compositions, in weight percent, of various alloy steels suitable for use in the cutting edges, spikes, etc. of this invention, the remainder being iron:

|  | Type-10 | Type-11 | Type-13-a | Type-13-b | Type-13-c |
|---|---|---|---|---|---|
| Carbon | 0.65–1.00 | 0.25–0.60 | 0.55–0.85 | 0.60–0.90 | 0.65–0.80 |
| Vanadium |  | ᵃ 0.30–1.20 | 0.75–2.25 | 0.75–2.50 | 0.75–2.25 |
| Chromium | 3.25–4.25 | 1.25–4.50 | 3.50–4.50 | 3.50–4.50 | 3.50–4.50 |
| Tungsten |  | 8.00–19.00 | 13.00–21.00 | ᵃ 1.00–2.50 | 12.00–21.00 |
| Molybdenum | ᵃ 0.40–0.60 |  | 0.40–0.90 | 6.00–9.00 | ᵃ 0.50–1.00 |
| Cobalt |  |  |  |  | 3.50–13.00 |

ᵃ May contain none.

As the plastic melted, a circular perforation developed which was somewhat larger in diameter than the diameter of the needle point. In this particular instance, the needle could be safely handled with the bare hands because of the low voltage used. A series of perforations along a single line was made through the several layers of plastic on the rule in such a manner that a row of openings was produced. The two films were joined at the periphery of each of these punched openings.

While the above examples refer to the sealing together of two layers of thermoplastic material, it would be realized that more than two layers of thermoplastic material can be cut and heat sealed in the manner described. In each of the above examples a six-volt source of alternating electrical current was used. However, equally good results can be obtained with direct current, especially for intermittent and portable equipment. The resistance of the plate, sealing element or the cutter was such that a current of four amperes was found to flow in the circuit. This current provided sufficient heating of the cutting mechanism to provide a proper fusing and sealing of the cut or punctured edges of materials. The embodiments of the invention illustrated in FIGURES 4, 5, 6 and 7 have particular utility in sealing covers to packages, all made of thermoplastic materials. Such seals made by apparatus of these figures provide substantially airtight seals.

While certain embodiments of the invention have been described for illustrative purposes, the invention obviously is not limited thereto.

I claim:

1. An apparatus for heat sealing one layer of a thermoplastic material to another layer of a thermoplastic material comprising, in combination, a fixed plate of a first electrical conducting material, a mechanical incisor of a second electrical conducting material having a greater resistance to the flow of electrical current than said first electrical conducting material, first means supporting said plate, second means movably supporting said incisor, said second means being adapted to move said incisor into contact and out of contact with said plate, a source of electrical current connected with said plate and with said incisor, said incisor being adapted to rupture mechanically thermoplastic materials positioned intermediate said incisor and said plate whereby after rupture of said material said incisor contacts said plate and completes an electrical circuit through said incisor and plate whereby said incisor becomes heated and heat seals one layer of thermoplastic material to another layer of thermoplastic material positioned therebetween.

2. The apparatus of claim 1 wherein said incisor is a spike.

3. The apparatus of claim 1 wherein said incisor is a cutter.

4. An apparatus for heat sealing one layer of a thermoplastic material to another layer of a thermoplastic material comprising, in combination, a plate of a first electrical conducting material, an incisor, first means supporting said plate, second means supporting rotatably said incisor, a source of electrical current connected operably with said plate and with said incisor, said incisor comprising a wheel having a plurality of spaced spikes extending radially outwardly from the periphery thereof, said wheel being of an electrical conducting material, said spikes being of an electrical conducting material having a greater resistance to the flow of electrical current than said first conducting material and also a greater resistance than the material of said wheel, said second means supporting said incisor in such a manner that as said wheel rotates each successive spike mechanically pierces layers of thermoplastic material positioned intermediate said each spike and said plate and subsequently contacts said plate, thereby completing an electrical circuit whereby said each spike becomes heated because of the electrical resistance of said spikes thereby heat sealing said layers of thermoplastic to each other in the vicinity of said each spike.

5. An apparatus for cutting a plurality of superimposed layers of thermoplastic material and heat sealing mutually adjacent cut edges to one another comprising, in combination, a plate of a first electrical conducting material, an incisor, first means supporting said plate, second means supporting rotatably said incisor adjacent said plate, a source of electrical current connected operably with said plate and with said incisor, said incisor comprising a wheel having a periphery, said periphery being a cutting edge, said cutting edge facing away from the wheel, said wheel being of an electrical conducting material having a greater resistance to the flow of electrical current than the resistance of said plate, the cutting edge of said wheel being adapted to cut layers of thermoplastic material introduced intermediate said plate and said incisor, and said cutting edge of said wheel upon cutting said layers of thermoplastic material contacts said plate thereby completing an electrical circuit whereby at least the cutting edge of said wheel becomes heated and heat seals to one another the mutually adjacent cut edges of said layers of thermoplastic material.

6. An apparatus for cutting and heat sealing a plurality of layers of thermoplastic material and simultaneously heat sealing mutually adjacent cut edges to one another comprising, in combination, a plate of a first electrical conducting material, an incisor having a cutting edge, first means supporting said plate, second means supporting said incisor with a portion of said cutting edge being in contact with said plate, said incisor comprising a cutter knife, said cutter knife having an elongated cutting edge with one end of said edge being in contact with said plate, said cutter knife being an electrical conductor having electrical resistance greater than the electrical resistance of said plate, electrical leads connecting said knife and said plate to a source of electrical energy, the cutting edge of said knife being adapted to cut thermoplastic material, the portion of said cutting edge in contact with said plate being the following portion and the leading portion being spaced from said plate, means for moving thermoplastic material to be cut and sealed between the spaced leading portion of said cutting edge and the adjacent portion of said plate toward the portion of said cutting edge in contact with said plate, whereby said thermoplastic material is cut and the contacted portion of said cutting edges is heated due to the passage of electrical current through the greater electrical resistance of said cutting edge to a thermoplastic sealing temperature thereby sealing the mutually adjacent cut edges of said plurality of layers of thermoplastic material.

References Cited in the file of this patent

UNITED STATES PATENTS

| | | |
|---|---|---|
| 2,248,057 | Bond | July 8, 1941 |
| 2,516,609 | Woodward | July 25, 1950 |
| 2,638,963 | Frederick et al. | May 19, 1953 |
| 2,711,779 | Carland | June 28, 1955 |
| 2,727,128 | Jaye | Dec. 13, 1955 |
| 2,735,797 | Schjeldahl | Feb. 21, 1956 |
| 2,748,863 | Benton | June 5, 1956 |
| 2,759,090 | Frye | Aug. 14, 1956 |
| 2,781,079 | Ruby et al. | Feb. 12, 1957 |
| 2,868,942 | Lyijynew | Jan. 13, 1959 |
| 2,879,367 | McLean | Mar. 24, 1959 |

FOREIGN PATENTS

| | | |
|---|---|---|
| 291,684 | Great Britain | June 7, 1928 |